(12) United States Patent
Devendran et al.

(10) Patent No.: US 10,889,158 B2
(45) Date of Patent: Jan. 12, 2021

(54) MOTOR VEHICLE INCLUDING A CLIMATE CONTROL SYSTEM WITH ACCUMULATOR, AND CORRESPONDING METHOD

(71) Applicant: Ford Global Technologies, LLC, Dearborn, MI (US)

(72) Inventors: Ram Sudarsan Devendran, South Lyon, MI (US); John Edward Brevick, Livonia, MI (US); Steven Anatole Frait, Milan, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 110 days.

(21) Appl. No.: 16/266,603

(22) Filed: Feb. 4, 2019

(65) Prior Publication Data
US 2020/0247211 A1    Aug. 6, 2020

(51) Int. Cl.
*B60H 1/00* (2006.01)
*B60T 1/10* (2006.01)
*B60T 17/02* (2006.01)

(52) U.S. Cl.
CPC ......... *B60H 1/005* (2013.01); *B60H 1/00385* (2013.01); *B60H 1/00428* (2013.01); *B60T 1/10* (2013.01); *B60T 17/02* (2013.01)

(58) Field of Classification Search
CPC .............. B60H 1/005; B60H 1/00385; B60H 1/00428; B60T 17/02; B60T 1/10
See application file for complete search history.

(56) References Cited

U.S. PATENT DOCUMENTS 5,255,529 A * 10/1993 Powell ................. B60H 1/3205
62/180
5,348,083 A * 9/1994 Hosoya .................. B21D 53/02
165/173
5,507,153 A    4/1996 Seto et al.
(Continued)

FOREIGN PATENT DOCUMENTS

JP    2006238528 A    9/2006

OTHER PUBLICATIONS

Clegg, S.J. "A Review of Regenerative Braking Systems," Working Paper. Institute of Transport Studies, White Rose Research Online URL for this paper: http://eprints.whiterose.ac.uk/2118/. 1996 University of Leeds, Leeds, UK.
(Continued)

Primary Examiner — Emmanuel E Duke
(74) Attorney, Agent, or Firm — David B. Kelley; Carlson, Gaskey & Olds, P.C.

(57) ABSTRACT

This disclosure relates to a motor vehicle including a climate control system with an accumulator, and a corresponding method. An example motor vehicle includes a powertrain and a climate control system configured to meet a thermal conditioning demand. The climate control system includes an accumulator and a compressor driven by the powertrain. Further, a controller is in electronic communication with the climate control system, and the controller is configured to selectively command the climate control system to charge the accumulator when an amount of energy available to the compressor from the powertrain is in excess of an amount of energy required to meet the thermal conditioning demand.

21 Claims, 7 Drawing Sheets

(56) References Cited

U.S. PATENT DOCUMENTS

| | | |
|---|---|---|
| 8,484,961 B2 | 7/2013 | McCormick et al. |
| 2002/0112489 A1 | 8/2002 | Egawa et al. |
| 2013/0042602 A1* | 2/2013 | Gauthier .................. B60K 6/12 60/327 |
| 2014/0027091 A1 | 1/2014 | Schneider et al. |
| 2015/0159613 A1* | 6/2015 | Jensen .................. B60W 10/06 701/68 |
| 2017/0167763 A1* | 6/2017 | Danov .................. B01F 5/0614 |

OTHER PUBLICATIONS

Jagannath, Suprith. "Regenerative Braking Aided Air Conditioning in Automotive Systems," Tech Briefs, Create the Future Design Contest 2018, Jun. 28, 2017. Downloaded from: https://contest.techbriefs.com/2017/entries/automotive-transportation/8077.

* cited by examiner

MOTOR VEHICLE INCLUDING A CLIMATE CONTROL SYSTEM WITH ACCUMULATOR, AND CORRESPONDING METHOD

TECHNICAL FIELD

This disclosure relates to a motor vehicle including a climate control system with an accumulator, and a corresponding method.

BACKGROUND

Automatic climate control is increasingly prevalent in motor vehicles today. In such vehicles, a user chooses a temperature setting, and a climate control system works to heat or cool a passenger cabin to meet the thermal conditioning demand. The climate control system may control the functions of various components, including a cooling circuit configured to cool the passenger cabin. The cooling circuit may include a compressor mechanically driven by the engine, which increases the load on the engine, and in turn increases fuel consumption.

SUMMARY

A motor vehicle according to an exemplary aspect of the present disclosure includes, among other things, a powertrain and a climate control system configured to meet a thermal conditioning demand. The climate control system includes an accumulator and a compressor driven by the powertrain. The vehicle further includes a controller in electronic communication with the climate control system. The controller is configured to selectively command the climate control system to charge the accumulator when an amount of energy available to the compressor from the powertrain is in excess of an amount of energy required to meet the thermal conditioning demand.

In a further non-limiting embodiment of the foregoing motor vehicle, the controller only commands the climate control system to charge the accumulator when the controller determines the accumulator is storing fluid at a pressure below a threshold.

In a further non-limiting embodiment of any of the foregoing motor vehicles, the controller commands the climate control system to charge the accumulator when the motor vehicle is braking.

In a further non-limiting embodiment of any of the foregoing motor vehicles, the controller commands the climate control system to charge the accumulator when a torque of the powertrain is negative.

In a further non-limiting embodiment of any of the foregoing motor vehicles, the controller commands the climate control system to charge the accumulator as a function of at least one of a deceleration of the motor vehicle and an amount of energy available to the compressor from the powertrain.

In a further non-limiting embodiment of any of the foregoing motor vehicles, the amount of energy available to the compressor is predicted using information pertaining to a route which the motor vehicle is traveling.

In a further non-limiting embodiment of any of the foregoing motor vehicles, the information pertaining to the route is obtained using at least one of a global positioning system (GPS), radio detecting and ranging (RADAR), and light detecting and ranging (LIDAR).

In a further non-limiting embodiment of any of the foregoing motor vehicles, the controller is configured to selectively command the climate control system to discharge the accumulator to meet the thermal conditioning demand when an amount of energy available to the compressor from the powertrain is insufficient to meet the thermal conditioning demand.

In a further non-limiting embodiment of any of the foregoing motor vehicles, the controller only commands the climate control system to discharge the accumulator when the controller determines that accumulator is storing fluid at a pressure above a threshold.

In a further non-limiting embodiment of any of the foregoing motor vehicles, the controller commands the climate control system to discharge the accumulator to pre-condition a cabin of the motor vehicle.

In a further non-limiting embodiment of any of the foregoing motor vehicles, the controller commands the climate control system to discharge the accumulator to pre-condition the cabin when a vehicle unlock command is received and when an ambient temperature is greater than a cabin temperature setting.

In a further non-limiting embodiment of any of the foregoing motor vehicles, the controller commands the climate control system to discharge the accumulator when an engine of the motor vehicle stops as a result of a start-stop mode being activated.

In a further non-limiting embodiment of any of the foregoing motor vehicles, the climate control system includes a main loop, and the accumulator is fluidly coupled to the main loop via a flow regulator configured to selectively open and close in response to commands from the controller.

In a further non-limiting embodiment of any of the foregoing motor vehicles, the main loop includes the compressor, a condenser downstream of the compressor, an expansion valve downstream of the condenser, an evaporator downstream of the thermal expansion valve, and a dryer downstream of the evaporator, the evaporator is a phase change material evaporator, and the accumulator is fluidly coupled to the main loop at a point between the condenser and the thermal expansion valve.

A method according to an exemplary aspect of this disclosure includes, among other things, charging an accumulator of a climate control system of a motor vehicle when an amount of energy available to a compressor of the climate control system from a powertrain is in excess of an amount of energy required to meet a thermal conditioning demand.

In a further non-limiting embodiment of the foregoing method, the charging step occurs only when the accumulator is storing fluid at a pressure below a threshold.

In a further non-limiting embodiment of any of the foregoing methods, the method further includes predicting the amount of energy that will be available to the compressor based on information pertaining to a route which the motor vehicle is traveling, and, during the charging step, a rate at which the accumulator is charged is a function of the prediction.

In a further non-limiting embodiment of any of the foregoing methods, the method further includes discharging the accumulator to meet the thermal conditioning demand when an amount of energy available to the compressor from the powertrain is insufficient to meet the thermal conditioning demand.

In a further non-limiting embodiment of any of the foregoing methods, the discharging step only occurs when the accumulator is storing fluid at a pressure above a threshold.

In a further non-limiting embodiment of any of the foregoing methods, the discharging step occurs when at least one of the following conditions is met: (1) a request has been made to pre-condition a cabin of the motor vehicle, and (2) an engine of the motor vehicle stops as a result of a start-stop mode of the motor vehicle being activated.

DETAILED DESCRIPTION

This disclosure relates to a motor vehicle including a climate control system with an accumulator, and a corresponding method. An example motor vehicle includes a powertrain and a climate control system configured to meet a thermal conditioning demand. The climate control system includes an accumulator and a compressor driven by the powertrain. Further, a controller is in electronic communication with the climate control system, and the controller is configured to selectively command the climate control system to charge the accumulator when an amount of energy available to the compressor from the powertrain is in excess of an amount of energy required to meet the thermal conditioning demand. In this way, the accumulator is charged efficiently and in a way that improves fuel economy. Further, the accumulator may be discharged when energy from the powertrain is insufficient to meet a thermal conditioning demand, when energy from the powertrain is unavailable altogether, or when it is preferable to keep the engine off. In particular, the accumulator may be discharged to pre-condition a passenger cabin or to run the climate control system while the motor vehicle is stopped when a start-stop mode is activated, as examples. These and other benefits will be appreciated from the below description.

Figure 1:
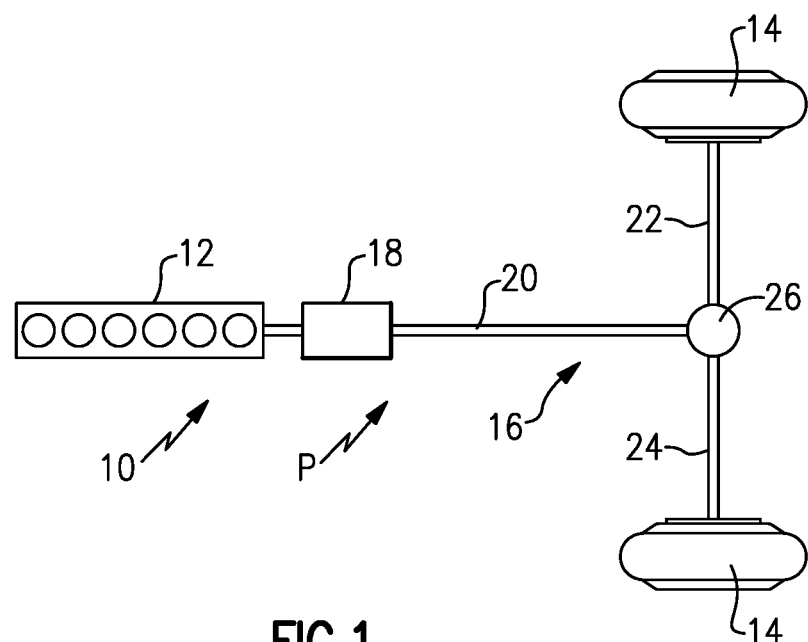
FIG. 1 schematically illustrates an example powertrain for a motor vehicle.
Figure 2:
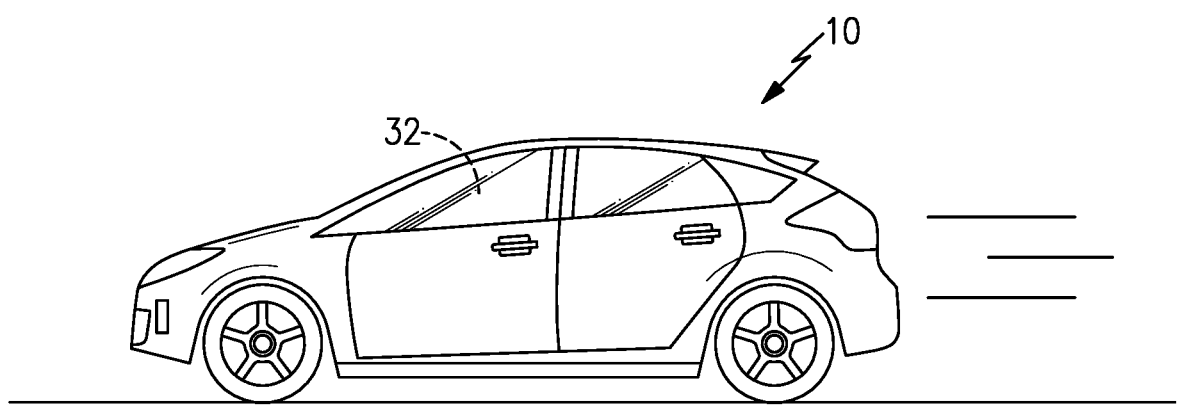
FIG. 2 illustrates a vehicle traveling on level ground.

FIG. 1 schematically illustrates various components of a powertrain P of a motor vehicle, such as the vehicle 10 (FIG. 2). The powertrain P in this disclosure refers to the main components of the vehicle 10 that generate power and deliver it to the road surface. The powertrain P includes an internal combustion engine (ICE) 12, which generates torque to drive one or more sets of vehicle drive wheels 14. The powertrain P further includes a driveline 16 and transmission 18, which together connect the engine 12 to the wheels 14. In particular, the engine 12 is connected to the wheels 14 via the transmission 18, drive shaft 20, axles 22, 24, and differential 26.

While the vehicle 10 includes only an internal combustion engine, this disclosure extends to vehicles with other drive systems, and in particular this disclosure extends to electrified vehicles. The vehicle 10 could be, for example, a hybrid electric vehicle (HEV), plug-in hybrid electric vehicle (PHEV), fuel cell vehicle (FCV), battery electric vehicle (BEV). This disclosure also extends to various types of hybrid vehicles including full hybrids, parallel hybrids, series hybrids, mild hybrids, micro hybrids, and plug-in hybrids.

Figure 3:
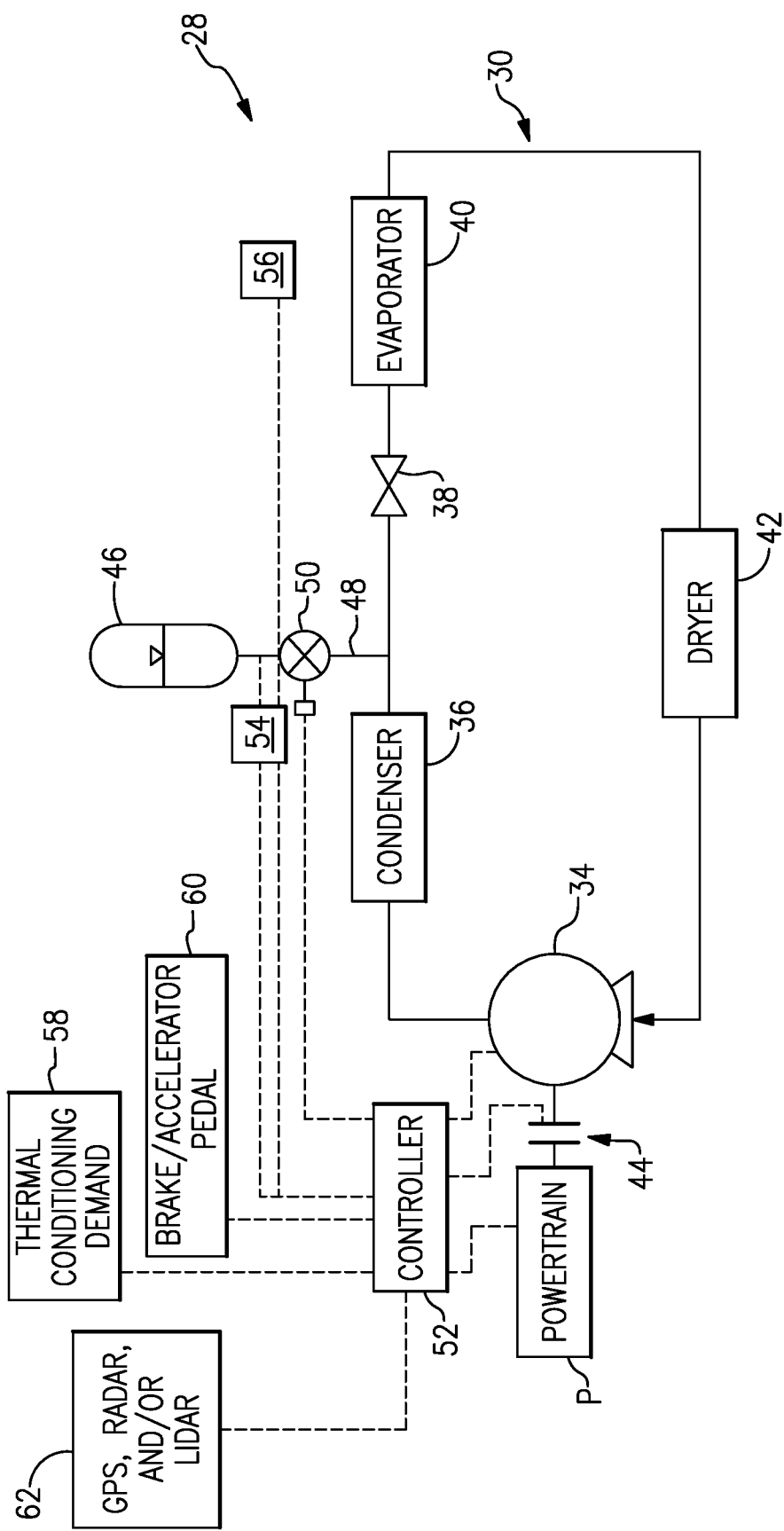
FIG. 3 schematically illustrates various components of an example climate control system of the vehicle.

In addition to the components shown in FIG. 1, the vehicle 10 also includes a climate control system 28, as shown in FIG. 3. The climate control system 28 is configured meet a thermal condition demand of the vehicle 10. In this example, climate control system 28 includes a main loop 30. The main loop 30 in FIG. 3 is a cooling circuit configured to cool a passenger cabin 32 (FIG. 2) of the vehicle 10. While a cooling circuit is shown, this disclosure could apply to a heating circuit which is configured to heat the passenger cabin 32. In other words, the main loop 30 could be configured to essentially function as a heat pump.

The main loop 30 includes a compressor 34, a condenser 36 downstream of the compressor 34, an expansion valve 38 downstream of the condenser 36, an evaporator 40 downstream of the expansion valve 38, and a dryer 42 downstream of the evaporator 40 and upstream of the compressor 34. The expansion valve 38 may be a thermal expansion valve in one example, however it should be understood that this disclosure extends to other types of expansion devices. Further, the evaporator 40 may include a phase change material (PCM) within the evaporator 40, however the evaporator 40 may be any type of evaporator. When the evaporator 40 is a PCM, the PCM may be used in combination with an accumulator 46 or independently to store kinetic energy as refrigeration energy. As one would appreciate, the climate control system 28 further includes a number of ducts, fans, valves, etc., which are not shown in FIG. 3.

The compressor 34 may be any known type of compressor, including a scroll compressor, centrifugal compressor, variable displacement compressor, etc., configured to increase the pressure of a flow of fluid within the main loop 30. To this end, the fluid within the main loop 30 may be any known type of refrigerant, such as R-12, R134a, or $CO_2$.

The compressor 34 is driven by the powertrain P via an accessory drive, for example. While not described in detail herein, the control logic of the engine 12 and transmission 18 may be set so as to ensure smooth and efficient transmission of power to the compressor 34 under various driving conditions. Kinetic energy from the powertrain P is transmitted to the compressor 34 via a connection 44. The connection 44 may be any known type of mechanical connection. The connection 44 may be a clutch, such as a torque converter bypass clutch, configured to selectively connect and disconnect the powertrain P and compressor 34, in one example. In one example, the connection 44 is configured to transmit torque from the drive shaft 20 to the compressor 34. The compressor 34, in turn, pressurizes the fluid within the main loop 30.

The climate control system 28 also includes an accumulator 46. The accumulator 46 is essentially a pressure storage reservoir configured to store pressurized fluid and hold the pressurized fluid under pressure until it is released. While this disclosure is not limited to any particular size for the accumulator 46, in one example the accumulator 46 has a volume of about 1 liter. The volume of the accumulator 46 may be selected by balancing the benefits of a larger accumulator, including increased range and/or fuel economy, with packaging constraints, for example.

The accumulator 46, in this example, is fluidly coupled to the main loop 30 via a line 48, which is fluidly coupled to the main loop 30 at a point downstream of the condenser 36 and upstream of the expansion valve 38. At this point along the main loop 30, the coolant may be in liquid phase and at a relatively high temperature and a high pressure. The coolant from the main loop 30 is readily stored in the accumulator 46 in this phase. The pressurized coolant stored in the accumulator 46 can be used to meet a thermal conditioning demand by introducing pressurized coolant into the main loop 30, much the same way as if the coolant did not flow from the accumulator 46 and were instead pressurized by the compressor 34.

The accumulator 46 is selectively fluidly coupled to the main loop 30 by a flow regulator 50, which is provided in the line 48. The flow regulator 50 is configured to selectively open and close to fluidly couple the accumulator 46 and the main loop 30. The flow regulator 50 may be provided by any known type of flow regulator, including electromechanical valves such as solenoid valves. The flow regulator 50 may be moveable between a fully open position, a closed position, and any number of other operative positions in between. In this way, the flow regulator 50 may be infinitely adjustable.

The operative position of the flow regulator 50 is set in response to commands from a controller 52. The controller 52 is in electronic communication with various components of the vehicle 10, including the climate control system 28, and in particular the compressor 34 and flow regulator 50. The controller 52 is configured to receive information from each sensor associated with the climate control system 28, some of which will be discussed below, and is further configured to interpret that information and issue commands to various components of the vehicle 10 based on that information. The controller 52 is shown schematically in FIG. 3. It should be understood that the controller 52 may include hardware and software, and could be part of an overall vehicle control module, such as a vehicle system controller (VSC), or could alternatively be a stand-alone controller separate from the VSC. Further, the controller 52 may be programmed with executable instructions for interfacing with and operating the various components of the vehicle 10. The controller 52 additionally includes a processing unit and non-transitory memory for executing the various control strategies and modes of the vehicle system. Although it is shown as a single device, the controller 52 may include multiple controllers in the form of multiple hardware devices, or multiple software controllers within one or more hardware devices. A controller area network (CAN), represented by the dashed lines in FIG. 3, allows the controller 52 to communicate with the various components of the vehicle 10.

In FIG. 3, the controller 52 is in electronic communication with a pressure sensor 54 adjacent the accumulator 46. The pressure sensor 54 may be provided by a known type of pressure sensor and is configured to generate a signal indicative of the pressure of the fluid stored within the accumulator 46. The controller 52 is also in electronic communication with a temperature sensor 56, which generates a signal indicative of a temperature of the passenger cabin 32, in one example. The controller 52 may also be in communication with other pressure and temperature sensors mounted elsewhere relative to the climate control system 28.

The controller 52 may also receive inputs of other information, such as information indicative of a thermal conditioning demand of the vehicle, represented at box 58. The thermal conditioning demand 58 may be a temperature setting input by a user using the infotainment system of the vehicle 10 or through some other interface. The thermal conditioning demand 58, in the example of FIG. 3, may be a cooling demand, in which the user has indicated a desire for a temperature of the passenger cabin 32 to decrease.

The controller 52 may further receive inputs indicative of a position of the brake or accelerator pedal, represented at box 60. The controller 52 may use such information to determine whether a braking event is occurring, for example. Further still, the controller 52 may be in electronic communication with various other sensors and systems associated with the vehicle 10, including information pertaining to a route which the vehicle 10 is traveling, represented at box 62. The information may include signals from a global positioning system (GPS), including maps, route information, and directions, or information from other sensors mounted to the vehicle 10 including radio detecting and ranging (RADAR) and/or light detecting and ranging (LIDAR) sensors.

The controller 52 is configured to interpret information from the various sensors and to issue commands to selectively charge (i.e., fill with fluid) and discharge (i.e., release the stored fluid) the accumulator 46. Specifically, the controller 52 is configured to selectively charge and discharge the accumulator 46 by issuing commands to set an operative position of the flow regulator 50 at appropriate times. Various aspects of a method in which the controller 52 charges and discharges the accumulator 46 will now be described relative to FIGS. 4-7.

Figure 4:
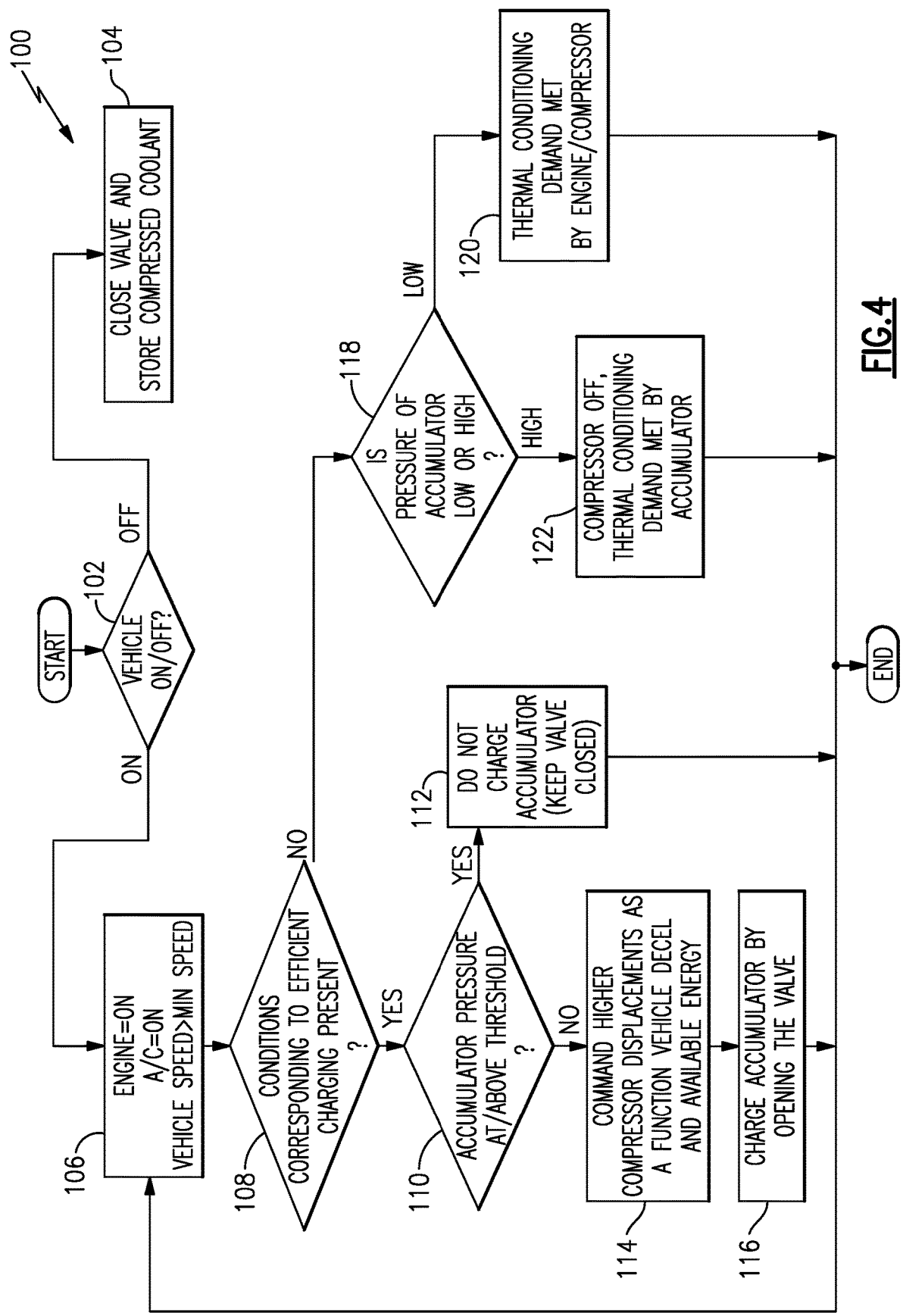
FIG. 4 is a flow chart representative of a first aspect of a method of this disclosure.

FIG. 4 is a flow chart representative of a first aspect of a method 100 according to this disclosure. In particular, FIG. 4 is representative of a control scheme that occurs as the vehicle 10 is undergoing city or highway driving. The method 100 may be performed by the various components of the vehicle 10, such as those discussed above. In particular, the decisions discussed within the method 100 are made by the controller 52.

The method 100 begins by determining whether the vehicle 10 is on or off, at 102. If the vehicle 10 is off, then the vehicle 10 is not actively undergoing city or highway driving. Thus, at 104, the flow regulator 50 is closed, at least momentarily, and any coolant within the accumulator 46 is stored. Despite the vehicle 10 being off, the flow regulator 50 may be opened based on the control schemes that will be discussed in FIG. 5 (pre-conditioning the cabin) and FIG. 6 (start-stop).

If the vehicle 10 is on, the controller 52 determines whether the vehicle 10 is undergoing city and/or highway driving, at 106. In this example, the controller 52 makes that determination based on whether the internal combustion engine 12 is on, a speed of the vehicle 10 is above a minimum threshold speed, and/or the climate control system 28 is activated. In a particular example, the controller 52 considers whether a user has provided a thermal conditioning demand that requires cooling (i.e., air conditioning).

If the conditions for city and/or highway driving are present, at 106, the method continues to step 108, in which the controller 52 determines whether certain other conditions are satisfied such that the accumulator 46 may be charged or discharged. These additional conditions include real-time actions of the vehicle 10, such as acceleration or braking, and/or other factors. The additional conditions correspond to conditions where it is efficient to charge of the accumulator 46. During such conditions, for example, the powertrain P provides excess kinetic energy to the compressor 34 than what is required to meet a particular thermal conditioning demand. The excess kinetic energy can be used to charge the accumulator 46, which is more efficient than charging the accumulator 46 when excess kinetic energy is not available, which would increase the load on the internal combustion engine 12.

While reference is made herein to energy, such as excess kinetic energy, it should be understood that power may also be considered, since energy and power are related concepts. Further, when this disclosure references excess energy, it is referencing excess kinetic energy as opposed to potential energy. That said, one aspect of this disclosure (FIG. 7) predicts an amount of kinetic energy that may be available to the compressor 34, and in that sense does relate to potential energy on some level.

Conditions where excess kinetic energy may be available to the compressor 34 from the powertrain P include: (1) when the brake pedal is applied, as determined using the information at 60, (2) when an accelerator pedal is not applied and the brake pedal is applied, (3) when neither brake pedal nor accelerator pedal are applied but the powertrain P is experiencing negative torque (i.e., coasting with negative torque), and (4) when neither the brake pedal nor the accelerator pedal are applied (i.e., coasting). As is known, "negative torque" refers to the calculated engine torque being negative. In each of the aforementioned conditions, the controller 52 may also consider whether fuel is "on" or "off," meaning whether the fuel injectors configured to deliver fuel to the engine 12 are "on" or "off." In one example, the fuel being "off," together with other conditions such as whether the vehicle 10 is coasting with negative torque, may be indicative of a condition in which the accumulator 46 can be efficiently charged. Further, it should be understood that the conditions listed in this paragraph are exemplary, and that this disclosure extends to other such conditions indicative of whether excess kinetic energy is available to the compressor 34 from the powertrain P.

If such conditions are present, at 110, the controller 52 uses information from the pressure sensor 54, for example, to determine whether the accumulator 46 has capacity to store additional coolant. In one example, the controller 52 considers whether the pressure of the accumulator 46 is above a threshold. The threshold in step 110 is a value indicative of a maximum pressure of the accumulator 46. If the accumulator 46 is already charged at or above the threshold level, then at 112 the controller 52 maintains the flow regulator 50 in a fully closed position and does not permit additional fluid to enter into the accumulator 46.

On the other hand, if the pressure of the accumulator 46 is below the threshold, then the accumulator 46 may be charged by opening the flow regulator 50. In particular, if the answer to 110 is "yes," then at 114 the controller 52 commands a higher displacement of the compressor 34 and meets that higher displacement with the excess kinetic energy from the powertrain P. The higher displacement of the compressor 34 may be a function of (i.e., proportional to) a rate of deceleration of the vehicle 10 and/or the amount of excess kinetic energy available to the compressor 34 from the powertrain P. At 116, the controller 52 commands the flow regulator 50 to open, either partially or fully, such that additional fluid is directed into the accumulator 46. Steps 114 and 116 may occur simultaneously. Steps 114 and 116 may continue until the accumulator 46 reaches the threshold or excess kinetic energy is no longer available.

Back to 108, if the answer is "no," the controller 52 determines whether the accumulator 46 can be discharged, meaning whether some of the stored, pressurized fluid within the accumulator 46 can be released in order to meet the thermal conditioning demand. At 118, the controller 52 considers the pressure of the accumulator 46 based on the signal from the pressure sensor 54. In particular, the controller 52 considers the pressure of the accumulator 46 relative to another threshold, or relative to two thresholds, such as an upper threshold and a lower threshold. The upper threshold may be the same as the threshold in step 110. Alternatively, the controller 52 may define other threshold value(s) altogether. The threshold(s) is/are indicative of whether the accumulator 46 is storing fluid at relatively high or low pressures, respectively.

If the pressure of the accumulator 46 is relatively low, meaning it is below the lower threshold, for example, the controller 52 at 120 determines that the thermal conditioning demand cannot be met by discharging the accumulator 46, and thus meets the thermal conditioning demand by increasing the demand on the internal combustion engine 12 and increasing the displacement of the compressor 34. If, on the other hand, the pressure of the accumulator 46 is relatively high, meaning the pressure is above the lower threshold and/or at or above the upper threshold, the accumulator 46 is discharged at 122 and the compressor 34 is turned off. In particular, the flow regulator 50 is opened, either partially or fully, and the connection 44 is disconnected. In this way, the thermal conditioning demand is met by introducing pressurized fluid into the main loop 30 via the accumulator 46 as opposed to the compressor 34.

Figure 5:
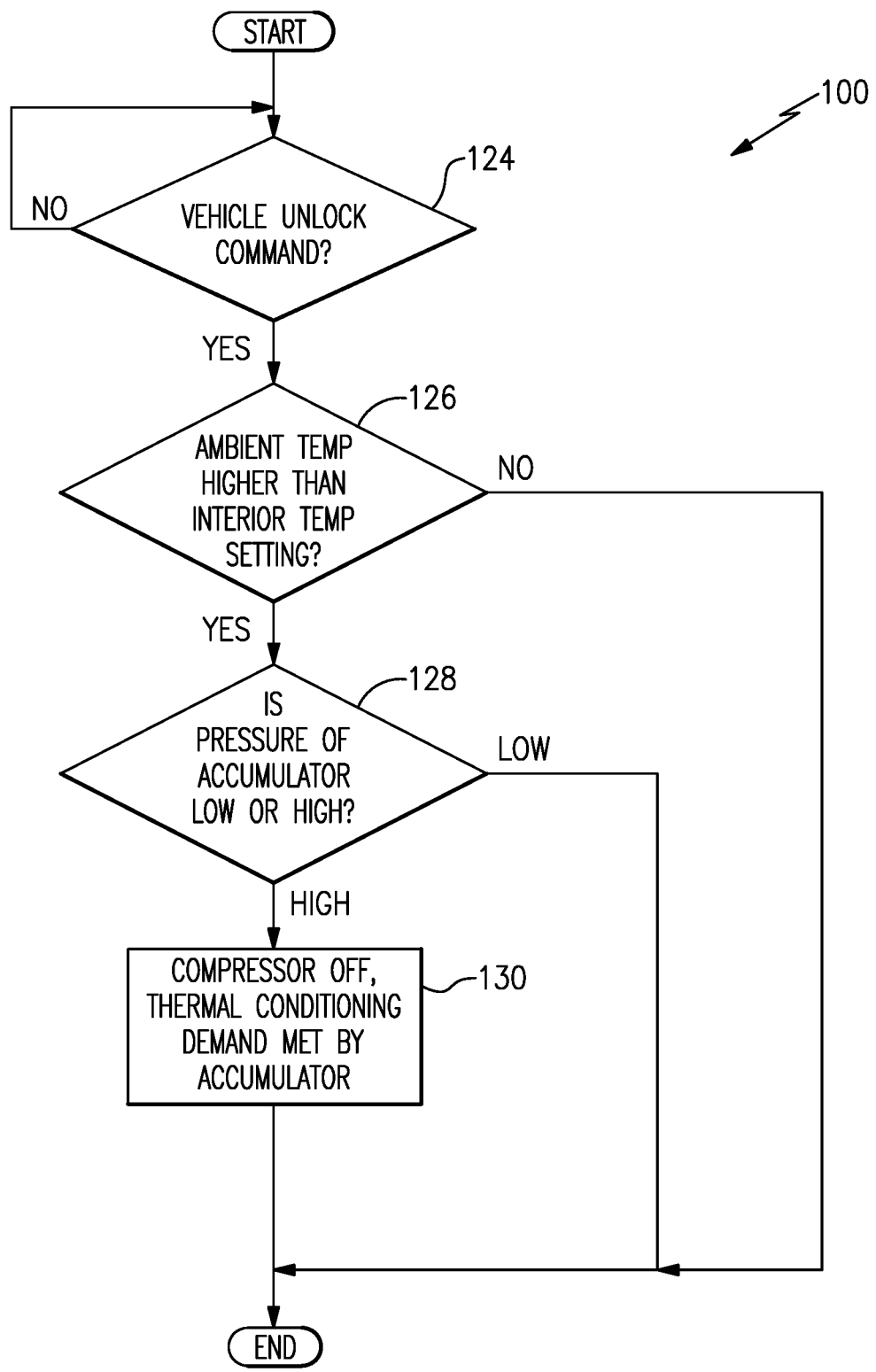
FIG. 5 is a flow chart representative of a second aspect of the method.

The accumulator 46 may be used to condition the passenger cabin 32 even when the internal combustion engine 12 is off. One such example is represented in the flowchart of FIG. 5, which illustrates a flow chart representative of an aspect of the method 100 relating to pre-conditioning the passenger cabin 32. Pre-conditioning the passenger cabin 32 involves thermally conditioning the passenger cabin 32 before a passenger enters the passenger cabin 32. In this way, passenger comfort is increased.

In FIG. 5, this aspect of the method 100 begins at 124, where a user provides an unlock command to the vehicle 10. The unlock command may be provided by the user pressing a button on a key fob or mobile device, or based on a detected proximity of the user to the vehicle 10. When the unlock command is received, the controller 52 considers, at 126, whether the ambient temperature is greater than a temperature setting for the passenger cabin 32. The temperature setting could have been stored from the last time the user exited the vehicle 10, for example, or based on some other input or factor. If the ambient temperature is greater than the temperature setting of the passenger cabin 32, then at 128 the controller 52 considers whether the pressure of the accumulator 46 is relatively low or high, similar to step 118, to determine whether the accumulator 46 may be discharged to pre-condition the passenger cabin 32.

If the pressure of the accumulator 46 is too low, then the controller 52 does not discharge the accumulator 46. If the pressure of the accumulator 46 is sufficient to meet the pre-conditioning demand, the controller 52 commands the flow regulator 50 to open, either partially or fully, thereby discharging the accumulator 46 to meet the thermal conditioning demand. The passenger cabin 32, thus, may be pre-conditioned without running the internal combustion engine 12, which reduces fuel use and reduces emissions.

Figure 6:
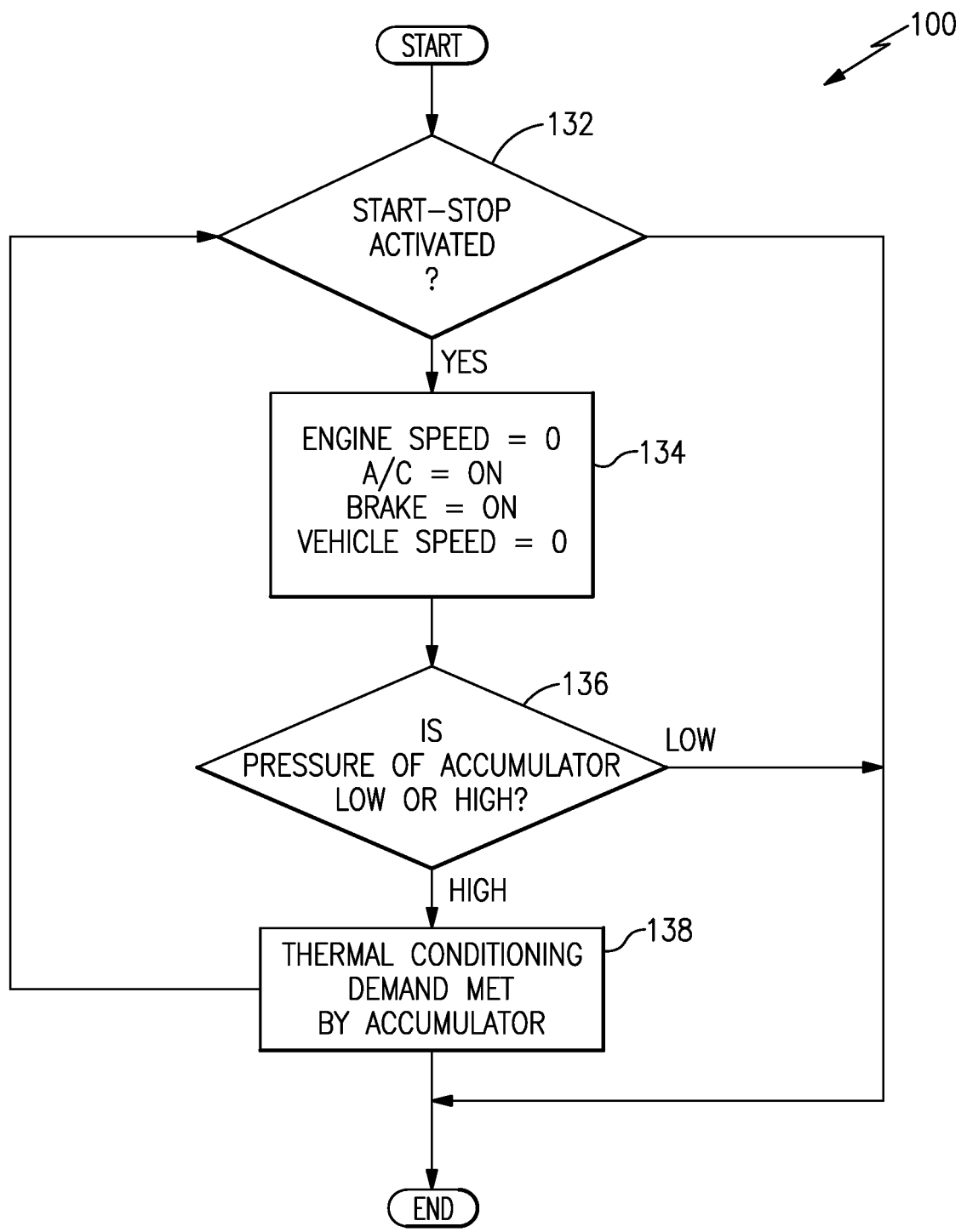
FIG. 6 is a flow chart representative of a third aspect of the method.

FIG. 6 represents another aspect of the method 100 in which the accumulator 46 is used to condition the passenger cabin 32 even when the internal combustion engine 12 is off. In particular, FIG. 6 illustrates a flow chart representative of an aspect of the method 100 relating to a vehicle running in a start-stop mode. As mentioned above, the vehicle 10 may be a start-stop vehicle. When a start-stop mode of the vehicle 10 is activated, the internal combustion engine 12 is configured to automatically shut down and restart to reduce the amount of time the vehicle 10 spends idling. However, if a thermal conditioning demand is present, some start-stop vehicles cannot automatically shut down because, if they did, the thermal conditioning demand would not be met. In this disclosure, the accumulator 46 may be discharged to meet a thermal conditioning demand, thus permitting the internal combustion engine 12 to shut down during idle, which saves fuel.

In FIG. 6, this aspect of the method 100 begins at 132, where the controller 52 considers whether a start-stop mode of the vehicle 10 has been activated. If the start-stop mode is activated then, at 134, the controller 52 monitors for conditions where the vehicle 10 is idling and wherein the internal combustion engine 12 could be turned off. These conditions include whether the speed of the vehicle 10 is zero (0), the speed of the internal combustion engine 12 is zero (0), and/or the brake pedal is applied. These conditions may also include whether there is a thermal conditioning demand, such as a user having provided an input requiring the passenger cabin 32 to be cooled (i.e., air conditioning). If such conditions are met, then at 136 the controller 52 makes a determination, similar to at steps 118 and 128, regarding whether the pressure of the accumulator 46 is such that the accumulator 46 may be discharged to meet the thermal conditioning demand. If so, at 138, the accumulator 46 is discharged to meet the thermal conditioning demand. Using the accumulator 46 in this way reduces the reliance on the internal combustion engine 12 to meet the thermal conditioning demand during times when the start-stop mode would have otherwise turned the internal combustion engine 12 off, which saves fuel.

Figure 7:
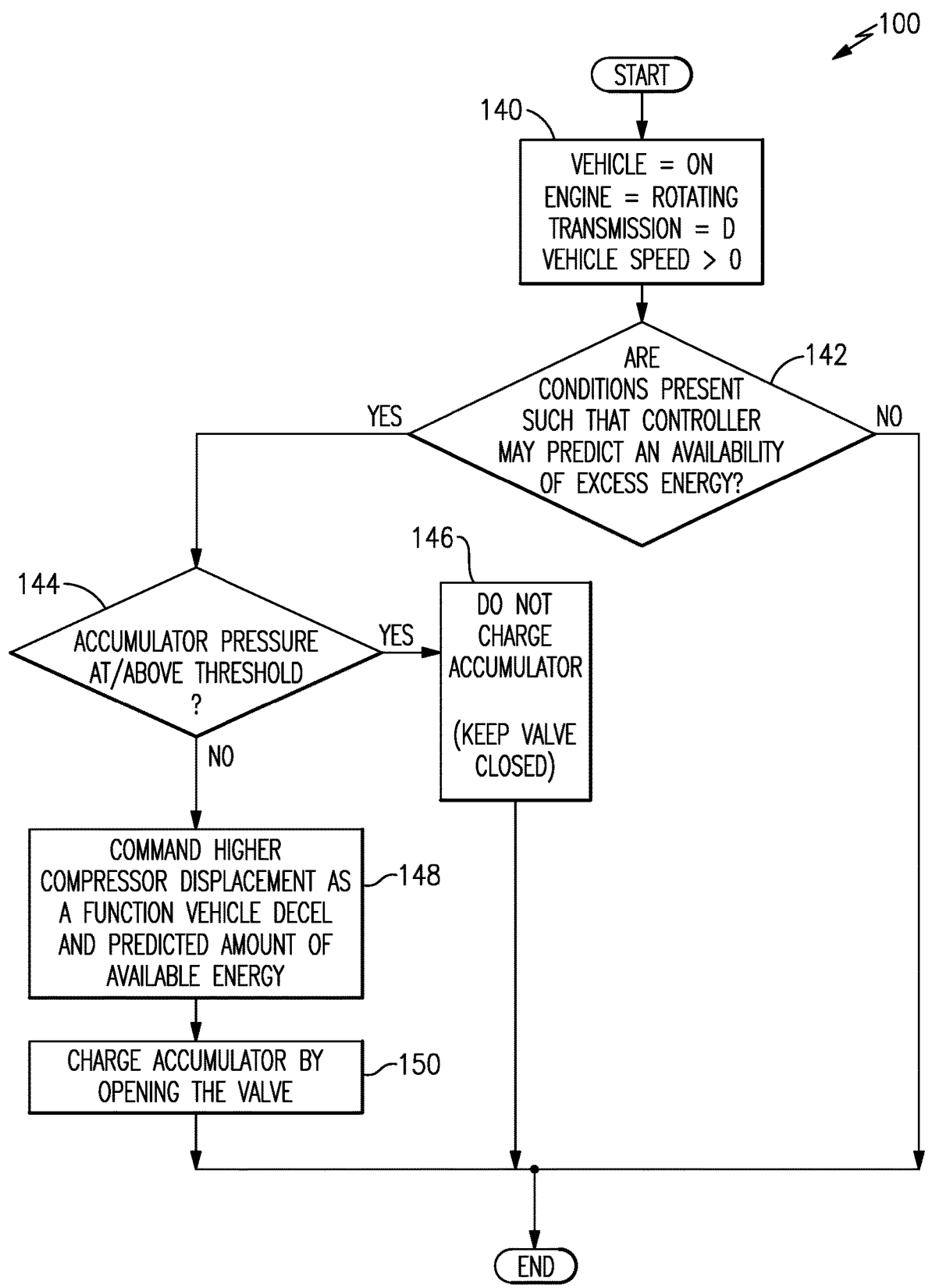
FIG. 7 is a flow chart representative of a fourth aspect of the method.

In addition to considering real time conditions where excess kinetic energy may be available to the compressor 34 from the powertrain P, the controller 52 may also predict when excess kinetic energy will be available and, if so, the amount of excess energy that may be available. In particular, the controller 52 bases such predictions on the information received at box 62 in FIG. 3, which pertains a route along which the vehicle 10 is traveling. FIG. 7 illustrates a flow chart representative of an aspect of the method 100 in which the controller 52 makes such predictions.

In FIG. 7, this aspect of the method 100 begins, at 140, when the internal combustion engine 12 is on, the vehicle 10 is on, in drive, and traveling at a non-zero speed. Then, at 142, the controller 52 determines whether conditions are present such that the controller 52 may predict that an amount of excess energy will be available to the compressor 34. The prediction may include a estimated amount of energy that will be available to the compressor 34 and a duration during which the estimated amount of energy will be available. The estimate may be used to confirm that real time behavior of the vehicle 10 is not incidental, but is rather indicative of an onset of a longer period of time that excess energy will be available.

Figure 8:
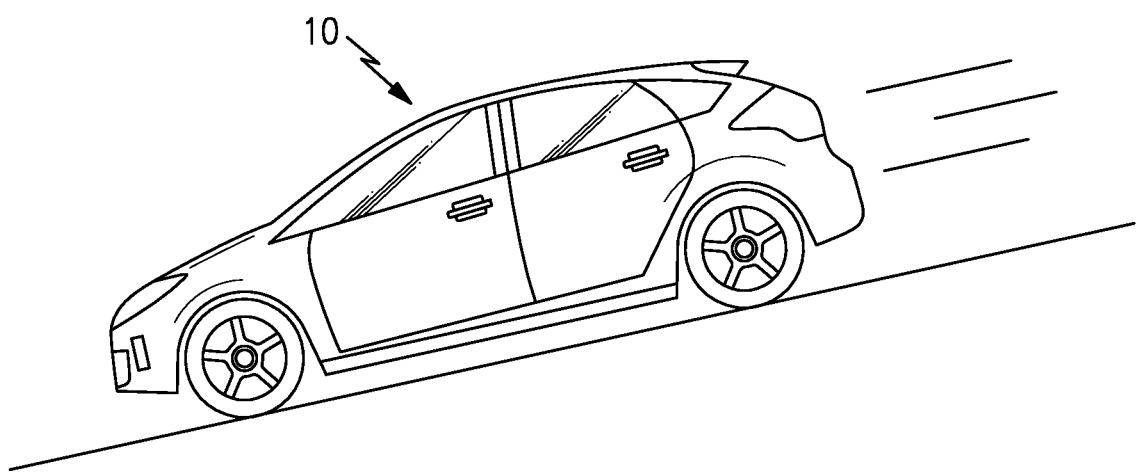
FIG. 8 illustrates a vehicle descending a grade.

As one example condition, the controller 52 may use information from GPS, for example, to determine that the vehicle 10 is approaching or actively traveling down a negative grade, as shown in FIG. 8. When the vehicle 10 travels down the negative grade, the powertrain torque may be negative. The information from the GPS, for example, may include the severity of the grade and the length of time that the vehicle 10 is expected to travel down the negative grade, and thus allow the controller 52 to make a prediction regarding the amount of excess energy that may be available to the compressor 34 during that period of time.

As another example condition, information from GPS, RADAR, LIDAR, or the like, may be used to determine whether the vehicle 10 is approaching a stop sign or intersection, for example. The information can include information regarding the length of time it may take for the vehicle 10 to come to a stop at a stop sign, for example. Further, and again, the information can be used to confirm that the user's depression of a brake pedal, for example, is indicative of the vehicle 10 beginning to slow to a stop, as opposed to an incidental tap of the brake pedal. Thus, again, the information from the GPS, RADAR, and LIDAR can be used by the controller 52 to confirm other vehicle actions are indicative of an onset of a time period during which excess energy will be available to the compressor 34.

As another example, the controller 52 is configured to identify situations where the internal combustion engine 12 is operating near its peak efficiency, and is capable of operating at a higher load to reach its peak efficiency point. Such situations include when the vehicle 10 is ascending a hill, for example.

The controller 52 is not limited to considering the three example conditions discussed above in step 142. The controller 52 may consider other factors that are indicative of excess energy potentially becoming available to the compressor 34.

If, at 142, the controller 52 predicts that excess energy will be available to the compressor 34 from the powertrain P, the controller 52 may follow a process similar to steps 110, 112, 114, and 116. In particular, the controller 52, at 144, the controller 52 uses information from the pressure sensor 54, for example, to determine whether the accumulator 46 has capacity to store additional fluid. If the accumulator 46 is already been charged to the threshold level, then at 146 the controller 52 maintains the flow regulator 50 in a fully closed position and does not permit additional fluid to enter into the accumulator 46. If the pressure of the accumulator 46 is below the threshold, then the accumulator 46 may be charged by commanding a higher displacement of the compressor 34, at 148. In step 148, the command, and in turn the rate at which the accumulator 46 is charged, is be based on the predicted amount of excess energy available to the compressor 34, as determined in step 142. At 150, the controller 52 commands the flow regulator 50 to open, either partially or fully, such that additional fluid is directed into the accumulator 46. As above, this may continue until the accumulator 46 reaches the threshold or the excess kinetic energy is no longer available.

While various aspects of the method 100 are shown across FIGS. 4-7, it should be understood that the vehicle 10 may operate under one or more aspects of the method 100 in parallel. For instance, the vehicle 10 may be controlled corresponding to each of FIGS. 4-7 in parallel. In that example, the vehicle 10 may be a start-stop vehicle, with the start-stop mode activated, and may operate under the control scheme of FIG. 4 during city/highway driving, under the control scheme of FIG. 5 when parked, under the control scheme of FIG. 6 when idling, and under the control scheme of FIG. 7 when an excess energy prediction can be made based on available information.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a powertrain;
   a climate control system configured to meet a thermal conditioning demand, the climate control system including an accumulator and a compressor driven by the powertrain; and
   a controller in electronic communication with the climate control system, the controller configured to selectively command the climate control system to charge the accumulator when an amount of energy available to the compressor from the powertrain is in excess of an amount of energy required to meet the thermal conditioning demand.

2. The motor vehicle as recited in claim 1, wherein the controller only commands the climate control system to charge the accumulator when the controller determines the accumulator is storing fluid at a pressure below a threshold.

3. The motor vehicle as recited in claim 2, wherein the controller commands the climate control system to charge the accumulator when the motor vehicle is braking.

4. The motor vehicle as recited in claim 2, wherein the controller commands the climate control system to charge the accumulator when a torque of the powertrain is negative.

5. The motor vehicle as recited in claim 2, wherein the controller commands the climate control system to charge the accumulator as a function of at least one of a deceleration of the motor vehicle and an amount of energy available to the compressor from the powertrain.

6. The motor vehicle as recited in claim 5, wherein the amount of energy available to the compressor is predicted using information pertaining to a route which the motor vehicle is traveling.

7. The motor vehicle as recited in claim 6, wherein the information pertaining to the route is obtained using at least one of a global positioning system (GPS), radio detecting and ranging (RADAR), and light detecting and ranging (LIDAR).

8. The motor vehicle as recited in claim 1, wherein the controller is configured to selectively command the climate control system to discharge the accumulator to meet the thermal conditioning demand when an amount of energy available to the compressor from the powertrain is insufficient to meet the thermal conditioning demand.

9. The motor vehicle as recited in claim 8, wherein the controller only commands the climate control system to discharge the accumulator when the controller determines that accumulator is storing fluid at a pressure above a threshold.

10. The motor vehicle as recited in claim 9, wherein the controller commands the climate control system to discharge the accumulator to pre-condition a cabin of the motor vehicle.

11. The motor vehicle as recited in claim 10, wherein the controller commands the climate control system to discharge the accumulator to pre-condition the cabin when a vehicle unlock command is received and when an ambient temperature is greater than a cabin temperature setting.

12. The motor vehicle as recited in claim 9, wherein the controller commands the climate control system to discharge the accumulator when an engine of the motor vehicle stops as a result of a start-stop mode being activated.

13. The motor vehicle as recited in claim 1, wherein the climate control system includes a main loop, and wherein the accumulator is fluidly coupled to the main loop via a flow regulator configured to selectively open and close in response to commands from the controller.

14. The method as recited in claim 1, further comprising a clutch connecting a drive shaft of the powertrain to the compressor.

15. A motor vehicle, comprising:
    a powertrain;
    a climate control system configured to meet a thermal conditioning demand, the climate control system including an accumulator and a compressor driven by the powertrain; and
    a controller in electronic communication with the climate control system, the controller configured to selectively command the climate control system to charge the accumulator when an amount of energy available to the compressor from the powertrain is in excess of an amount of energy required to meet the thermal conditioning demand,
    wherein the climate control system includes a main loop, and wherein the accumulator is fluidly coupled to the main loop via a flow regulator configured to selectively open and close in response to commands from the controller,
    wherein the main loop includes the compressor, a condenser downstream of the compressor, an expansion valve downstream of the condenser, an evaporator downstream of the thermal expansion valve, and a dryer downstream of the evaporator,
    wherein the evaporator is a phase change material evaporator, and
    wherein the accumulator is fluidly coupled to the main loop at a point between the condenser and the thermal expansion valve.

16. A method, comprising:
    charging an accumulator of a climate control system of a motor vehicle when an amount of energy available to a compressor of the climate control system from a powertrain is in excess of an amount of energy required to meet a thermal conditioning demand.

17. The method as recited in claim 16, wherein the charging step occurs only when the accumulator is storing fluid at a pressure below a threshold.

18. The method as recited in claim 17, further comprising:
    predicting the amount of energy that will be available to the compressor based on information pertaining to a route which the motor vehicle is traveling, and
    wherein, during the charging step, a rate at which the accumulator is charged is a function of the prediction.

19. The method as recited in claim 16, further comprising:
    discharging the accumulator to meet the thermal conditioning demand when an amount of energy available to the compressor from the powertrain is insufficient to meet the thermal conditioning demand.

20. The method as recited in claim 19, wherein the discharging step only occurs when the accumulator is storing fluid at a pressure above a threshold.

21. The method as recited in claim 19, wherein the discharging step occurs when at least one of the following conditions is met: (1) a request has been made to precondition a cabin of the motor vehicle, and (2) an engine of the motor vehicle stops as a result of a start-stop mode of the motor vehicle being activated.

\* \* \* \* \*